(12) United States Patent
Muhammad et al.

(10) Patent No.: US 12,718,276 B2
(45) Date of Patent: Aug. 25, 2026

(54) PERSONALIZING ARTICLES USING GENERATIVE ARTIFICIAL INTELLIGENCE

(71) Applicant: MASTERCARD INTERNATIONAL INCORPORATED, Purchase, NY (US)

(72) Inventors: Rahmana Muhammad, Brooklyn, NY (US); Alonso Araujo, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 94 days.

(21) Appl. No.: 18/644,023

(22) Filed: Apr. 23, 2024

(65) Prior Publication Data

US 2024/0354823 A1 Oct. 24, 2024

Related U.S. Application Data

(60) Provisional application No. 63/497,953, filed on Apr. 24, 2023.

(51) Int. Cl.
*G06Q 30/0601* (2023.01)
*G06T 11/23* (2026.01)

(52) U.S. Cl.
CPC .......... *G06Q 30/0621* (2013.01); *G06T 11/23* (2026.01); *G06T 2210/16* (2013.01)

(58) Field of Classification Search
None
See application file for complete search history.

(56) References Cited

U.S. PATENT DOCUMENTS 11,995,803 B1 * 5/2024 Karpman .................. G06T 5/70
2011/0292451 A1 * 12/2011 Harvill .................... H04N 1/54 358/1.9

(Continued)

FOREIGN PATENT DOCUMENTS

CN 109949213 A 6/2019
CN 107578367 B 10/2020

OTHER PUBLICATIONS

Adding Conditional Control to Text to Image Diffusion Models (Year: Feb. 2023).*

(Continued)

*Primary Examiner* — Victoria E. Frunzi
(74) *Attorney, Agent, or Firm* — Barta Jones, PLLC

(57) ABSTRACT

A computer-implemented method generates a requested image based on an image style. An image style is selected, and an image generation model is trained using the selected image style. In some examples, the image generation model is a diffusion model. An image request input is received (e.g., text input, drawing input, and/or voice input) and, based on the received image request input, an image is generated using the trained image generation model. The generated image is in the selected image style. The generated image is then output in response to the received image request input. Further, in some examples, feedback associated with the generated image is received and the image generation model is further trained based on the received feedback to improve the quality of its image generation. Additionally, in some examples, the generated image is applied to an item for sale, enabling users to personalized items with generated images.

19 Claims, 9 Drawing Sheets

(56) References Cited

U.S. PATENT DOCUMENTS

| | | | | |
|---|---|---|---|---|
| 2014/0169683 | A1* | 6/2014 | Wang | G06F 16/5854 382/199 |
| 2018/0204336 | A1 | 7/2018 | Fang et al. | |
| 2018/0240257 | A1 | 8/2018 | Li et al. | |
| 2020/0160612 | A1* | 5/2020 | Bowen | G06N 3/045 |
| 2021/0007459 | A1* | 1/2021 | Jeong | G06T 19/00 |
| 2022/0222872 | A1 | 7/2022 | Ghosh et al. | |

OTHER PUBLICATIONS

Yang, Jeong Rok, "International Search Report & Written Opinion", International Application No. PCT/US2024/025632, mailed Aug. 7, 2024, 11 pages.

* cited by examiner

300

PERSONALIZING ARTICLES USING GENERATIVE ARTIFICIAL INTELLIGENCE

BACKGROUND

Personalizing a physical article, such as a fashion item including clothing, a bag, a purse, and so forth, traditionally involves receiving an image from a customer that is then printed or otherwise placed on the item. However, this method of personalization requires a specific image to be provided while leaving little to no room for artistic representation. Current techniques fail to meet the technical challenge of enabling users to capture their imagined style and personalized preferences in a technically-friendly, user-friendly and/or cost-effective way.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computer-implemented method for generating a requested image based on an image style is described. An image style is selected, and an image generation model is trained using the selected image style. In some examples, the image generation model is a diffusion model. An image request input is received (e.g., text input, drawing input, and/or voice input) and, based on the received image request input, an image is generated using the trained image generation model. The generated image is in the selected image style. The generated image is then output in response to the received image request input. Further, in some examples, feedback associated with the generated image is received and the image generation model is further trained based on the received feedback to improve the quality of its image generation.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale. Any of the drawings may be combined into a single embodiment or example.

DETAILED DESCRIPTION

Figure 1:
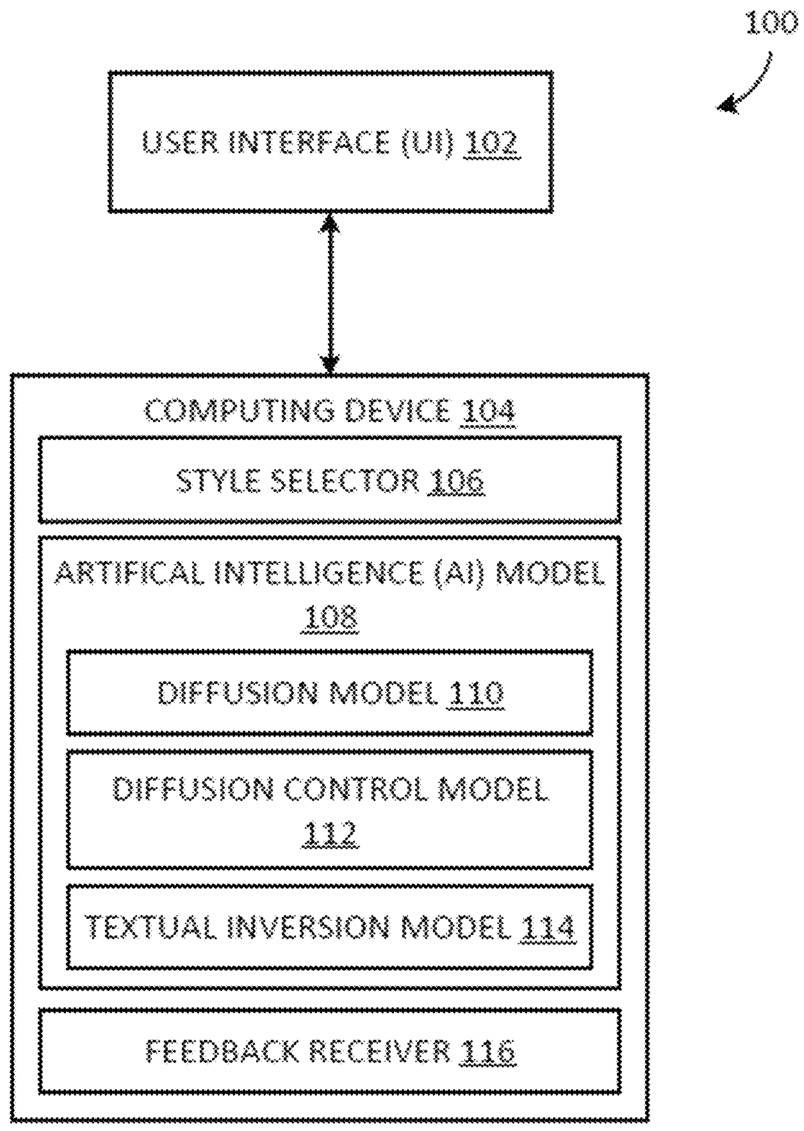
FIG. 1 illustrates a block diagram of an example system for personalizing articles using generative artificial intelligence (AI)

The present disclosure is directed to systems and methods for using generative AI to personalize articles or other items, such as those for sale in electronic commerce (e-commerce). For example, systems and methods of the disclosure generate a particular AI model, or enhance a previously-generated AI model, for the item and style. A user interface receives an input, and the AI model generates an image corresponding to the received input in the style for the item.

In some examples, the AI model implements a diffusion model, a diffusion control model, and a textual inversion model. The diffusion model generates the image corresponding to the received input. The diffusion model is enhanced by the textual inversion model, which sets parameters, or conditions, which specializes the diffusion model for the particular style so that the generated image is generated in the particular style. The diffusion model is also enhanced by the diffusion control model, which enables the diffusion model to translate the received input into a high-quality generated image.

Some examples described herein provide a technical solution to an inherently technical problem by providing a generative AI model that improves the usability of the model for a user as well as improving user interaction with a computing device. The improved generative AI model improves usability for a user by generating an image from a received input from the user in a particular artistic style and increases the user interaction performance by improving the arrangement and display of the generated images, resulting in a more efficient user interaction with the underlying device.

In some examples, one or more aspects of the present disclosure are implemented to enhance productivity across a multitude of industries. For example, the diffusion model described herein enables a business to rapidly prototype and introduce a new product, such as by iterating on product designs including visual art and descriptions. This, in turn, enables efficient product development and testing, resulting in a streamlined process to bring new products to market. In addition, the diffusion model described herein enables products and services to be tailored in an efficient and scalable manner, including hyper-personalizing products in an individual or predetermined style, such as in an image to image (img-to-img) workflow.

In some examples, the disclosure includes a method for generating images based on user input comprising receiving, via a graphical user interface (GUI), image request input (e.g., text input or drawing input) from a user, generating an image based on the received image request input using a trained image generation model, wherein the generated image is in a specific image style, and automatically updating the GUI to display the generated image to the user in response to the received image request input. Thus, the disclosure includes a practical use of a GUI to automatically update and display a model-generated image to a user in response to the user's provided image request input, resulting in an improved user interface for electronic devices.

Further, in some examples, the image generation step from the method above includes processors executing operations to train the image generation model, wherein executing those operations includes dividing training operations across multiple processors and executing those divided training operations in parallel on the multiple processors. This training process cannot be practically performed in a human mind, at least because it requires the parallel processing of training operations across multiple processors.

FIG. 1 illustrates a block diagram of a system for personalizing an article using generative AI according to an example. The system 100 illustrated in FIG. 1 is presented for illustration only. Various examples of the system 100 may be implemented without departing from the scope of the present disclosure.

The system 100 includes a user interface (UI) 102 and a computing device 104. In some examples, the UI 102 is implemented on the computing device 104. In some examples, the UI 102 is external to the computing device 104, such as on a separate computing device 104. The UI 102 includes a graphics card for displaying data to a user and receiving data from the user. For example, the UI 102 includes a display, for example a touch screen display or natural user interface, and/or computer-executable instructions, for example a driver, for operating the display. In some examples, the UI 102 presents content, including examples of one or more commercially available items for sale, and receives one or more inputs that select an item and provide a representation for which an image is generated.

The computing device 104 selects an artistic style (e.g., an image style) for a particular item or article and generates an image based on the input received at the UI 102. The style can be a style of a particular artist, collection (e.g., spring collection, winter collection, and the like), or another category or type. For example, the computing device 104 includes a style selector 106 that selects a style for a particular image, an AI model 108 that generates the image in the selected style, and a feedback receiver 116 that receives feedback from a user regarding the generated image. The style selector 106 selects a style for an image to be generated. In some examples, the style is a predetermined style set by the computing device 104 or by a device on which the UI 102 is implemented. For example, the style selector 106 predetermines that images are generated in a particular style for a subset of items provided for sale. In another example, the style selector 106 selects a style based on input received at the UI 102 that selects the style from a list of potential styles.

The AI model 108 (e.g., an image generation model) includes a diffusion model 110, a diffusion control model 112, and a textual inversion model 114. In some examples, the diffusion model 110 is a stable diffusion model. The diffusion model 110 generates an image in the selected style based on the input (e.g., an image request input) received at the UI 102. The diffusion model 110 is trained, and then enhanced by the diffusion control model 112 and the textual inversion model 114. In some examples, the diffusion model 110 is trained by receiving, as input, images in the selected style and associating the received images with a keyword that corresponds to the selected style. For example, where a selected style is "flowers," the diffusion model 110 receives images of flowers as inputs and associates the received images with the keyword "flowers". In another example, where a selected style is "cars," the diffusion model 110 receives images of automobiles as inputs and associates the received images with the keyword "cars". It should be understood that the example styles and keywords presented here are used for illustration only and should not be construed as limiting. Various examples of a selected style and associated keyword may be used without departing from the scope of the present disclosure.

The diffusion control model 112 (e.g., ControlNet) is an example of a neural network that enhances the diffusion model 110 by imposing parameters to stabilize the diffusion model 110. The imposed parameters improve the spatial consistency of the diffusion model 110 by training the diffusion model 110 on which aspects of a received image to keep as part of a generated image and which aspects of the received image to discard. For example, where the training image is an image of a flower, the diffusion control model 112 identifies one or more aspects of each training input image of a flower that actually correspond to the flower and which aspects correspond to superfluous aspects of the image, i.e., parts of the image that are not the flower. In some examples, the diffusion control model 112 is implemented as a plugin, a browser extension, or application programming interface (API).

The textual inversion model 114 is an example of a model that implements textual inversion to tune, or enhance, the diffusion model 110. As referenced herein, textual inversion refers to a technique that captures particular concepts from a set of training images. For example, the textual inversion model 114 captures concepts, such as an artistic style or object in a training image, and describes the captured concept using a keyword. Thus, the textual inversion model 114 is applied to the diffusion model 110 to further enhance the diffusion model 110 to identify the artistic style and/or object in the received training images and correlate the identified style and/or object with the keyword. More particularly, the textual inversion model 114 is applied to identify the representation of the image and remove the noise that is not identified as the representation of the image. This application of the textual inversion model 114 to the diffusion model 110 enables the diffusion model 110 to more effectively denoise and enhance the image.

The UI 102 receives an input, such as a drawing or text. The computing device 104 receives an indication of the input, including an image of the drawing or the text received as the input, and generates an image corresponding to the received input. To generate the image, the diffusion model 110 implements a stable diffusion model. The stable diffusion model operates using forward and backward diffusion. In forward diffusion, the diffusion model 110 compresses the received input from traditional pixel space into latent space, which captures a more fundamental and semantic meaning of the received input. The received input is iteratively updated by adding a small amount of noise to the image. The amount of noise is gradually updated over time to continually increase the amount of noise until the image is essentially just noise. Then, in backward diffusion, the noise is iteratively removed until all of the noise has been removed using the diffusion model 110. Upon all the noise being removed, the newly generated image is created based on the images used to train the diffusion model 110. The generated image is output to the UI 102, where it is presented to a user.

In some examples, the computing device 104 includes a feedback receiver 116 that receives feedback regarding the generated image. For example, the UI 102 presents a prompt to enter feedback regarding the generated image. In some examples, the feedback is binary, such as whether the generated image is received favorably or unfavorably or whether the generated image is similar to the received input or not similar to the received input. In other examples, the feedback is provided on a scale, such as one to five, one to ten, and so forth, where a score of one indicates a lack of favorability with the generated image or lack of similarity with the received input and a highest score indicates complete favorability with the generated image or high similarity with the received input. In other examples, the feedback is provided in a user's own words. The feedback received is used as an additional input to iteratively train the diffusion model 110. In other words, the diffusion model 110 is continually updated and improved to generate more accurate images in a next iteration of image generation.

Figure 2:
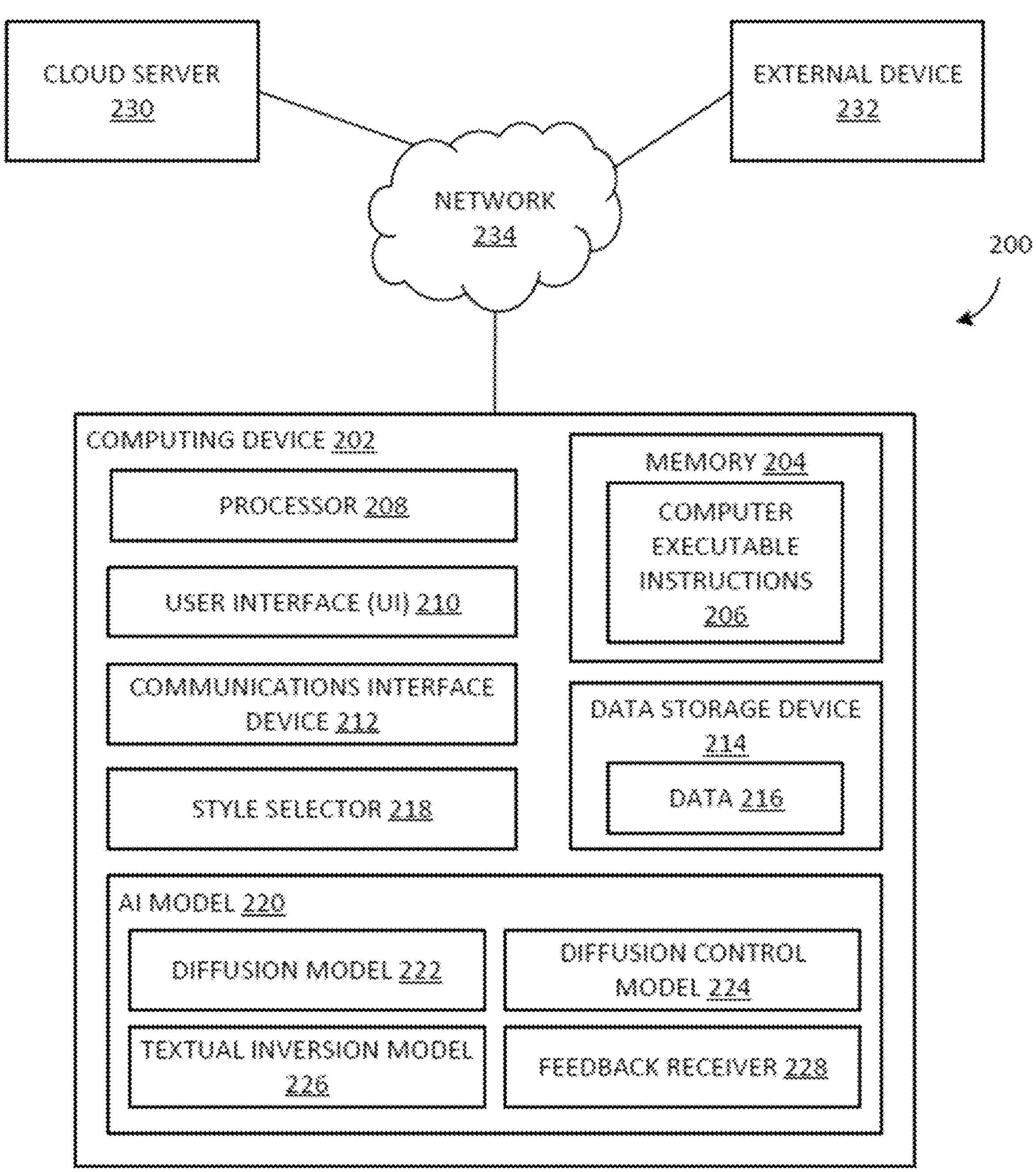
FIG. 2 illustrates a block diagram of an example system for personalizing articles using generative AI.

FIG. 2 illustrates a block diagram of a system for personalizing articles or items using generative AI according to an example. The system 200 illustrated in FIG. 2 is presented for illustration only. Various examples of the system 200 may be implemented without departing from the scope of the present disclosure. In some examples, the system 200 includes one or more components of the system 100, including the computing device 104 and the UI 102.

The system 200 includes a computing device 202, a cloud server 230, and an external device 232. Each of the computing device 202, the external device 232, and the cloud server 230 are communicatively coupled to and communicate via a network 234. The computing device 202 represents any device executing computer-executable instructions 206 (e.g., as application programs, operating system functionality, or both) to implement the operations and functionality associated with the computing device 202. The computing device 202, in some examples, is a device executed in the cloud. In some examples, the computing device 202 includes a mobile computing device or any other portable device. A mobile computing device can include servers, desktop computers, kiosks, IoT devices, or tabletop devices. Additionally, the computing device 202 can represent a group of processing units or other computing devices. In some examples, the computing device 202 is an example of the computing device 104 and/or a computing device on which the UI 102 is implemented.

In some examples, the computing device 202 is an example of the computing device 104 and the UI 102 is implemented on an example of the external device 232. For example, the external device 232 presents a representation of an item for sale and receives an input. The external device 232 transmits the received input to the computing device 202 via the network 234. The computing device 202 generates an image using an AI model, such as the AI model 220, corresponding to the received input in a selected style. The computing device 202 transmits the generated image to the external device 232 via the network 234, which then presents the generated image on an interface. In other examples, the computing device 202 is an example of the computing device 104 and the UI 102 is implemented on the computing device 202 as the UI 210, described in greater detail below.

In some examples, the computing device 202 includes at least one processor 208, a memory 204 that includes the computer-executable instructions 206, and a user interface (UI) 210. The processor 208 includes any quantity of processing units, including but not limited to a CPU or units, a graphics processing unit (GPU) or units, and a neural processing unit (NPU) or units. The processor 208 is programmed to execute the computer-executable instructions 206. The computer-executable instructions 206 are performed by the processor 208, performed by multiple processors within the computing device 202, or performed by a processor external to the computing device 202. In some examples, the processor 208 is programmed to execute computer-executable instructions 206 such as those illustrated in the figures described herein. In various examples, the processor 208 is configured to execute one or more of the communications interface device 212, data storage device 214, style selector 218, and artificial intelligence (AI) model 220 as described in greater detail below. In other words, the communications interface device 212, data storage device 214, style selector 218, and AI model 220 are implemented on and/or by the processor 208.

The memory 204 includes any quantity of media associated with or accessible by the computing device 202. The memory 204 in these examples is internal to the computing device 202, as illustrated in FIG. 2. In other examples, the memory 204 is external to the computing device 202 or both internal and external to the computing device 202. For example, the memory 204 can include both a memory component internal to the computing device 202 and a memory component external to the computing device 202. The memory 204 stores data, such as one or more applications. The applications, when executed by the processor 208, operate to perform various functions on the computing device 202. The applications can communicate with counterpart applications or services, such as web services accessible via the network 234. In an example, the applications represent downloaded client-side applications that correspond to server-side services executing in a cloud, such as the cloud server 230.

The UI 210 includes a graphics card for displaying data to a user and receiving data from the user. The UI 210 can also include computer-executable instructions, for example a driver, for operating the graphics card. Further, the UI 210 can include a display, for example a touch screen display or natural user interface, and/or computer-executable instructions, for example a driver, for operating the display. In some examples, such as where the UI 210 is an example of the UI 102, the UI 210 presents an image of an item for sale, receives an input, and then presents an image generated by an AI model, such as the AI model 220.

The communications interface device 212 includes a network interface card and/or computer-executable instructions, such as a driver, for operating the network interface card. Communication between the computing device 202 and other devices, such as but not limited to the cloud server 230, can occur using any protocol or mechanism over any wired or wireless connection. In some examples, where the computing device 202 is an example of the computing device 104 and the UI 102 is provided externally of the computing device 202, the communications interface device 212 receives the input from the UI 102 and, upon the AI model 220 generating an image based on the received input, transmits the generated image to the UI 102 to be presented on the UI 102.

The computing device 202 further includes a data storage device 214 for storing data, such as, but not limited to data 216. The data storage device 214, in this example, is included within the computing device 202, attached to the computing device 202, plugged into the computing device 202, or otherwise associated with the computing device 202. In other examples, the data storage device 214 includes a remote data storage accessed by the computing device 202 via the network 234, such as a remote data storage device, a data storage in a remote data center, or a cloud storage.

The computing device 202 further includes a style selector 218. In some examples, the style selector 218 is an example of the style selector 106. The style selector 218 is implemented on the processor 208 as a specialized computing processor that selects a style for a particular item that is used to generate the image. In some examples, the style is a predetermined style set by the computing device 202 or by an additional input received by the UI 102. For example, the style selector 218 may predetermine that images are generated in a particular style for a subset of items provided for sale. In another example, the style selector 218 selects a style based on input received at the UI 102 that selects the style from a list of potential styles. Examples of a particular style may be an object or group of objects in a graphic design, such as a flower, automobile, fictional character, animal, and so forth, or an artistic style, such as contemporary, abstract, modern, and so forth. It should be understood these examples are presented for illustration only and should not be construed as limiting. Various examples of a style may be used without departing from the scope of the present disclosure.

The computing device 202 further includes an AI model 220. The AI model 220 includes a diffusion model 222, a diffusion control model 224, and a textual inversion model 226. In some examples, the AI model 220 further includes a feedback receiver 228. In other examples, the feedback receiver 228 is provided separately from the AI model 220 as a separate specialized computing processor on the processor 208. In some examples, the AI model 220 is an example of the AI model 108, the diffusion model 222 is an example of the diffusion model 110, the diffusion control model 224 is an example of the diffusion control model 112, the textual inversion model 226 is an example of the textual inversion model 114, and the feedback receiver 228 is an example of the feedback receiver 116.

Figure 3A:
FIGS. 3A-3C illustrate examples of generating an image using generative AI based on a received input.
Figure 3B:
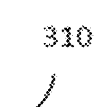
Figure 3B:
Figure 3C:
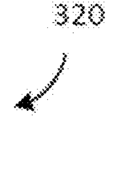
Figure 3C:

FIGS. 3A-3C illustrate examples of generating an image using generative AI based on a received input according to an example. The examples of generating an image using generative AI illustrated in FIGS. 3A-3C are presented for illustration only. Various examples of generating an image using generative AI may be used without departing from the scope of the present disclosure. In the examples illustrated in FIGS. 3A-3C, a style of flowers is pre-selected by the style selector 106.

FIG. 3A illustrates an example UI 300. The UI 300 is an example of the UI 102 which, as described herein, may be implemented on the external device 232 or the computing device 202. The UI 300 presents an example of an item prior to an input being received. For example, the UI 300 is presented on a display operable to receive an input, such as a drawing or a text input. In other examples, the UI 300 is operable to receive an input in other ways, such as a voice input that describes the text or image to be input into the UI 300.

The UI 300 illustrates an example of a shirt. However, numerous examples are possible. In various examples, the UI 300 presents an example of a bag, an automobile, a cup or mug, other clothing items besides a shirt such as a hat, jacket, and so forth, or any other type of item. The UI 300 further presents an example prompt to "GENERATE", which, upon selection, transmits a received input to the AI model 108 to generate an image based on the received input. The UI 300 further presents an example prompt to provide an updated input to be used to generate an image. Upon selection, the updated input is transmitted to the AI model 108 to generate an additional, or second, image based on the received input.

FIG. 3B illustrates an example 310. The UI 310 is an example of the UI 300 following an input being received at the UI 300. For example, the same item is illustrated on the UI 310 that was illustrated on the UI 300, but an input is received that is illustrated on the example shirt. The input illustrated in FIG. 3B includes a line input in a swirl shape that gradually increases its diameter and resembles a rose. Following the reception of a second input that selects the "GENERATE" prompt on the UI 310, the received input is transmitted to the computing device 104.

FIG. 3C illustrates an example UI 320. The UI 320 is an example of the UI 310 following the received input being transmitted to the computing device 104, the AI model 108 generating an image based on the received input, the generated image being transmitted to the UI 102, and the generated image being presented on the UI 310. The UI 320 illustrates the generated image being an example of a rose, consistent with the selected style of flower, based on the input that is received and illustrated in FIG. 3B.

In some examples, the degree to which the generated image matches or corresponds to the received input is adjustable, such as via a slider bar on the UI, or as a setting by an entity such as a retail merchant offering the shirt for sale.

Figure 4:
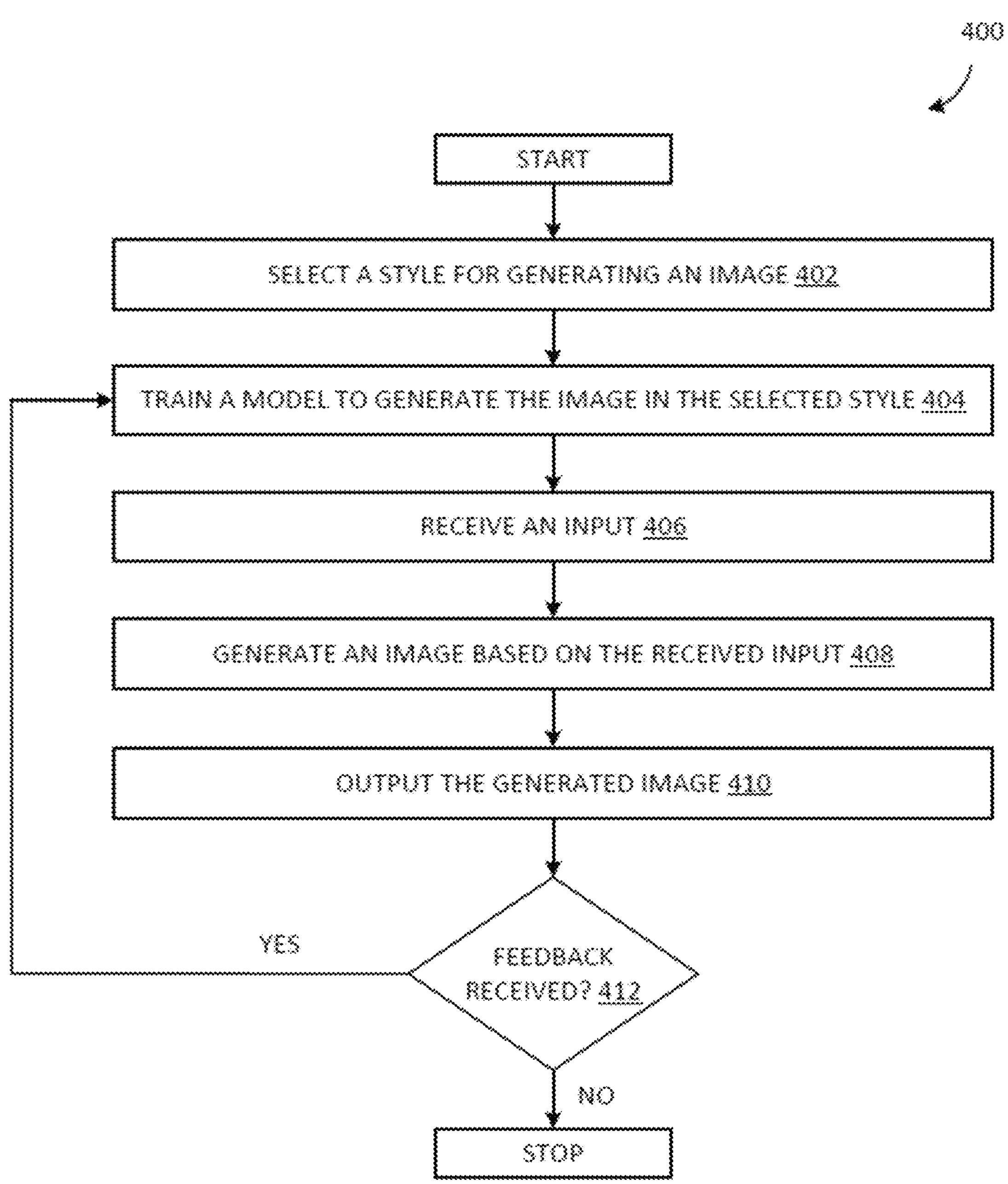
FIG. 4 is a flow chart illustrating an example computer-implemented method for generating an image using generative AI based on a received input.

FIG. 4 is a flow chart illustrating a computer-implemented method for generating an image using generative AI based on a received input according to an example. The method 400 illustrated in FIG. 4 is for illustration only. Other examples of the method 400 may be used without departing from the scope of the present disclosure. The method 400 may be implemented by one or more components of the system 100 illustrated in FIG. 1, the system 200 illustrated in FIG. 2, or the UI 300-320 illustrated in FIGS. 3A-3C.

The method 400 begins with the style selector 106 selecting a style, or image style, for an image to be generated in operation 402. As referenced herein, the selected style may be an object or group of objects, such as a flower, automobile, fictional character, animals, and so forth, or an artistic style, such as contemporary, abstract, modern, and so forth. As illustrated in FIG. 3C, the selected style is flowers. In some examples, the style is a predetermined or default style set by the computing device 104 or by an additional input received by the UI 102. For example, the style selector 106 may predetermine that images are generated in a particular style for a subset of items provided for sale. In another example, the style selector 106 selects a style based on input received at the UI 102 that selects the style from a list of potential styles.

In operation 404, the diffusion model 110, or image generation model, is trained to generate an image in the selected style. As described herein, the diffusion model 110 is trained and enhanced by the diffusion control model 112 and the textual inversion model 114. For example, the diffusion model 110 receives, as input, images in the selected style and associates the received images with a keyword that corresponds to the selected style. For example, where a selected style is "flowers," the diffusion model 110 receives images of flowers as inputs and associates the received images with the keyword "flowers". In another example, where a selected style is "cars," the diffusion model 110 receives images of automobiles as inputs and associates the received images with the keyword "cars". The diffusion control model 112 enhances the diffusion model 110 by imposing parameters to stabilize the diffusion model 110. For example, the spatial consistency of the diffusion model 110 is improved by training the diffusion model 110 on which aspects of a received image to keep as part of a generated image and which aspects of the received image to discard. The textual inversion model 114 is applied to the diffusion model 110 to further enhance the diffusion model 110 to identify the artistic style and/or object in the received training images and correlate the identified style and/or object with the keyword.

In operation 406, the computing device 104 receives an indication of an input (e.g., image request input) being received at the UI 102. In some examples, where the UI 102 is implemented as a component of the computing device 104, operation 406 includes receiving the input. In other examples, where the UI 102 is implemented as an external component of the computing device 104, such as where the UI 102 is implemented on the external device 232 and the computing device 104 is the computing device 202, the input is received at the UI 102 and transmitted to the computing device 104. In some examples, the received input is a drawing of an image. In other examples, the received input is text, such as text describing an image. An example of the received input is illustrated in the UI 310, illustrated in FIG. 3B.

In some examples, the received input further includes additional detail selected by the user regarding the image to be generated. For example, the input may toggle settings for the image to be generated including, but not limited to, a degree of creativity for the generated image, i.e., how similar the image to be generated is to the received input.

In operation 408, the diffusion model 110 generates an image based on the received input. To generate the image, the diffusion model 110 implements a diffusion process. The received input is used as a random noise image that is iteratively updated using a series of diffusion steps. At each step, the image is updated by adding a small amount of noise generated by the diffusion model 110. The amount of noise is gradually updated over time to continually increase the amount of noise until the image is stable. Then, the noise is removed until the newly generated image is created.

In operation 410, the generated image is output to the UI 102, where it is presented to a user. An example of the output image is illustrated in the UI 320, illustrated in FIG. 3C. In examples where the UI 102 is implemented externally of the computing device 104, the computing device 104 transmits the generated image to the UI 102 and the UI 102 presents the generated image in place on the item in a location proximate the originally received input. In some examples, outputting the generated image includes presenting options, on the UI 102, to adjust one or more aspects of the generated image. For example, the UI 102 may present additional elements that, in response to an additional input or sequence of inputs, are operable to change the color of, resize, rotate, drag, and so forth the generated image on the representation of the item.

Further, in some examples, the generated image output to the UI 102 is accepted or otherwise ordered by the user of the UI 102. In response to the acceptance of the generated image, in some such examples, the method includes controlling a device to print the generated image onto a physical item, such as a shirt, or otherwise cause the generated image to be applied to the physical item. In some such examples, controlling the device includes sending instructions to the device or otherwise sending a request to the device without departing from the description. It should be understood that, in some examples, the controlling of the device to apply the generated image to a physical item is performed directly, wherein the device that applies the generated image is part of a system with which the UI 102 is associated. Alternatively, in other examples, the controlling of the device to apply the generated image to a physical item is performed indirectly, wherein instructions or requests are sent from the system with which the UI 102 is associated to another system that includes the device configured for applying the generated image to the physical item.

In operation 412, the feedback receiver 116 determines whether feedback has been received regarding the generated image. For example, the UI 102 may solicit feedback regarding a favorability of the generated image or a similarity of the generated image to the received input as described herein. In examples where feedback is received from the UI 102, the computer-implemented method 400 returns to operation 404 and further trains the AI model 108 to improve future iterations of generated images. The AI model 108 may be trained with either positive (i.e., favorable) or negative (i.e., unfavorable) feedback. For example, favorable feedback is used as positive reinforcement for the AI model 108, while unfavorable feedback is used as negative reinforcement for the AI model 108. In examples where feedback is not received, the computer-implemented method 400 terminates.

In some examples, one or more aspects of the present disclosure are implemented in one or more of a virtual reality (VR), augmented reality (AR), or mixed reality (MR) environment. For example, one or both of the UI 102 and the computing device 104 may be implemented in one or more of a VR, AR, or MR environment where a UI 102 receives an input, the computing device 104 generates an image based on the received input, and the UI 102 outputs the generated image.

It should be understood that although presented herein as occurring in sequence, various examples are possible. For example, some operations may be performed simultaneously or in a different order than illustrated in FIG. 4. In some examples, multiple models are trained in multiple styles in operation 404 and then one of the styles is selected in operation 402. In another example, multiple models are trained in multiple styles in operation 404 and then an input is received in operation 406 that additionally selects the style.

Exemplary Operating Environment

Figure 5:
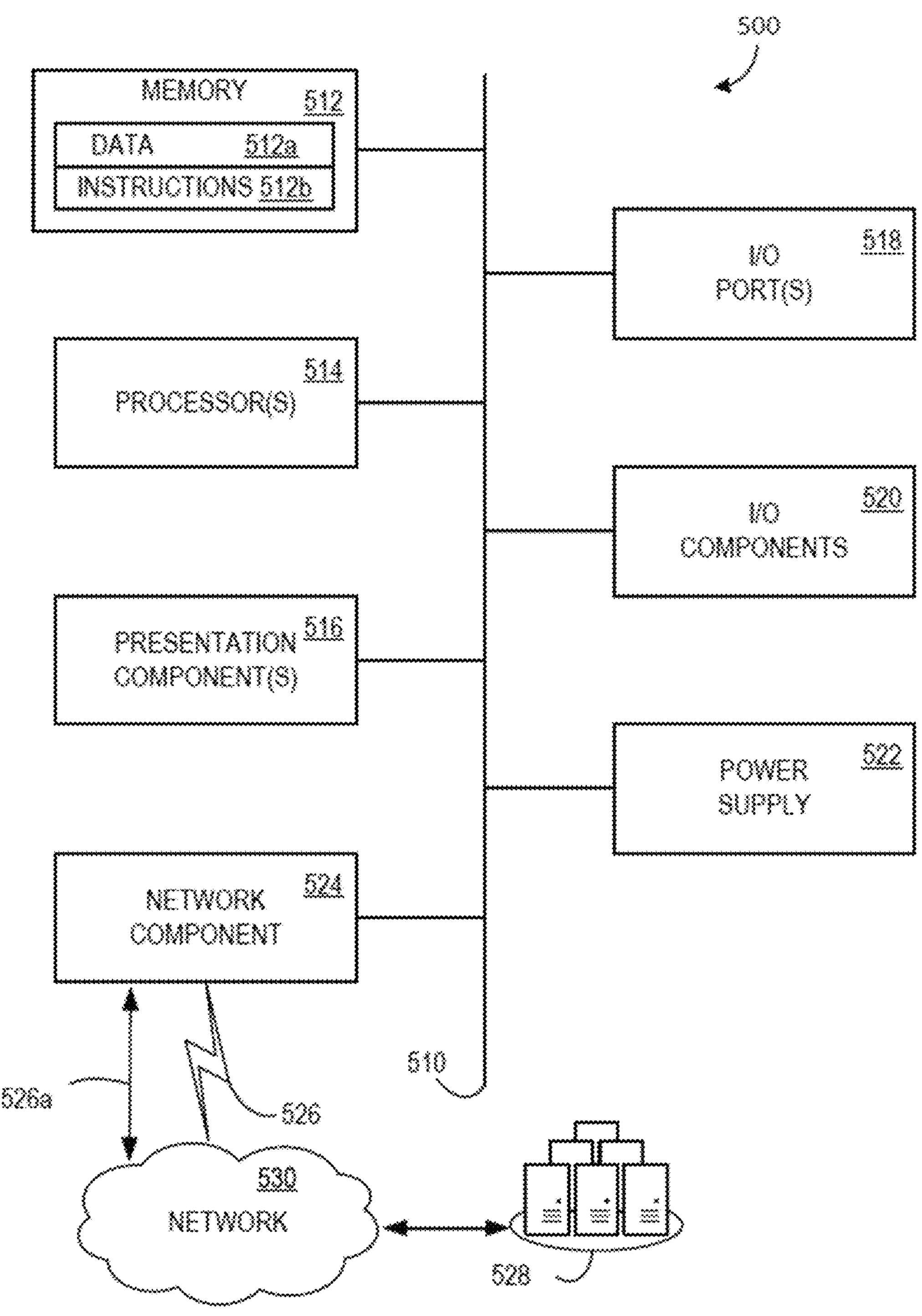
FIG. 5 is a block diagram illustrating an example computing apparatus.

FIG. 5 is a block diagram of an example computing device 500 for implementing aspects disclosed herein and is designated generally as computing device 500. Computing device 500 is an example of a suitable computing environment and is not intended to suggest any limitation as to the scope of use or functionality of the examples disclosed herein. Neither should computing device 500 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

In some examples, the computing device 500 is the computing device 202. Accordingly, the memory 512, the processor 514, the presentation component(s) 516, and the network 530 can be the memory 204, the processor 208, the UI 210, and the network 234, respectively. However, these examples should not be construed as limiting. Various examples are possible.

Computing device 500 includes a bus 510 that directly or indirectly couples the following devices: computer-storage memory 512, one or more processors 514, one or more presentation components 516, Input/Output (I/O) ports 518, I/O components 520, a power supply 522, and a network component 524. While computing device 500 is depicted as a seemingly single device, multiple computing devices 500 may work together and share the depicted device resources. For example, memory 512 may be distributed across multiple devices, and processor(s) 514 may be housed with different devices.

Bus 510 represents what may be one or more buses (such as an address bus, data bus, or a combination thereof). Although the various blocks of FIG. 5 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 5 and the references herein to a "computing device." Memory 512 may take the form of the computer storage media references below and operatively provide storage of computer-readable instructions, data structures, program modules and other data for computing device 500. In some examples, memory 512 stores one or more of an operating system, a universal application platform, or other program modules and program data. Memory 512 is thus able to store and access data **512*a* and instructions 512*b* that are executable by processor 514** and configured to carry out the various operations disclosed herein.

In some examples, memory 512 includes computer storage media in the form of volatile and/or nonvolatile memory, removable or non-removable memory, data disks in virtual environments, or a combination thereof. Memory 512 may include any quantity of memory associated with or accessible by computing device 500. Memory 512 may be internal to computing device 500, external to computing device 500, or both. Examples of memory 512 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 500. Additionally, or alternatively, memory 512 may be distributed across multiple computing devices 500, for example, in a virtualized environment in which instruction processing is carried out on multiple computing devices 500. For the purposes of this disclosure, "computer storage media," "computer-storage memory," "memory," and "memory devices" are synonymous terms for computer-storage memory 512, and none of these terms include carrier waves or propagating signaling.

Processor(s) 514 may include any quantity of processing units that read data from various entities, such as memory 512 or I/O components 520 and may include CPUs and/or GPUs. Specifically, processor(s) 514 are programmed to execute computer-executable instructions for implementing aspects of the disclosure. The instructions may be performed by the processor, by multiple processors within computing device 500, or by a processor external to client computing device 500. In some examples, processor(s) 514 are programmed to execute instructions such as those illustrated in the in the accompanying drawings. Moreover, in some examples, processor(s) 514 represent an implementation of analog techniques to perform the operations described herein. For example, the operations may be performed by an analog client computing device 500 and/or a digital client computing device 500. Presentation component(s) 516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 500, across a wired connection, or in other ways. I/O ports 518 allow computing device 500 to be logically coupled to other devices including I/O components 520, some of which may be built in. Example I/O components 520 include, for example but without limitation, a microphone, joystick, game pad, satellite dish, scanner, printer, wireless device, etc.

Computing device 500 may operate in a networked environment via network component 524 using logical connections to one or more remote computers. In some examples, network component 524 includes a network interface card and/or computer-executable instructions (e.g., a driver) for operating the network interface card. Communication between computing device 500 and other devices may occur using any protocol or mechanism over any wired or wireless connection. In some examples, network component 524 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 524 communicates over wireless communication link 526 and/or a wired communication link **526*a* to a cloud resource 528 across network 530. Various different examples of communication links 526 and 526*a*** include a wireless connection, a wired connection, and/or a dedicated link, and in some examples, at least a portion is routed through the internet.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: select an image style; train an image generation model using the selected image style; receive an image request input; generate an image based on the received image request input using the trained image generation model, wherein the generated image is in the selected image style; and output the generated image in response to the received image request input.

An example computer-implemented method comprises receiving an image request input; generating an image based on the received image request input using a trained image generation model, wherein the generated image is in an image style for which the trained image generation model was trained; and outputting the generated image in response to the received image request input.

An example computer storage medium has computer-executable instructions that, upon execution by a processor, cause the processor to at least select an image style; train an image generation model using the selected image style; receive an image request input; generate an image based on the received image request input using the trained image generation model, wherein the generated image is in the selected image style; and output the generated image in response to the received image request input.

Alternatively, or in addition to the other examples described herein, examples include any combination of the following:

- further comprising: selecting an image style; and training the image generation model using the selected image style.
- further comprising: receiving feedback associated with the generated image; and training the image generation model using the received feedback.
- wherein the receive image request input is received from a user interface (UI); and wherein outputting the generated image includes causing the generated image to be displayed on the UI.
- wherein the received image request input includes at least one of a text input, a drawing input, or a voice input.
- wherein the trained image generation model is a stable diffusion model, and the stable diffusion model is enhanced using a diffusion control model and a textual inversion model.
- wherein receiving an image request input includes: causing an item for sale to be displayed on a UI; prompting a user of the UI to input drawing input on the displayed item for sale; and receiving the drawing input in response to the prompting as the image request input; and further comprising applying the generated image to the item for sale.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for selecting an image style; exemplary means for training an image generation model using the selected image style; exemplary means for receiving an image request input; exemplary means for generating an image based on the received image request input using the trained image generation model, wherein the generated image is in the selected image style; and exemplary means for outputting the generated image in response to the received image request input.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Additional Examples

Figure 6:
FIG. 6 is a block diagram of an example structure for the disclosure.
Figure 6:
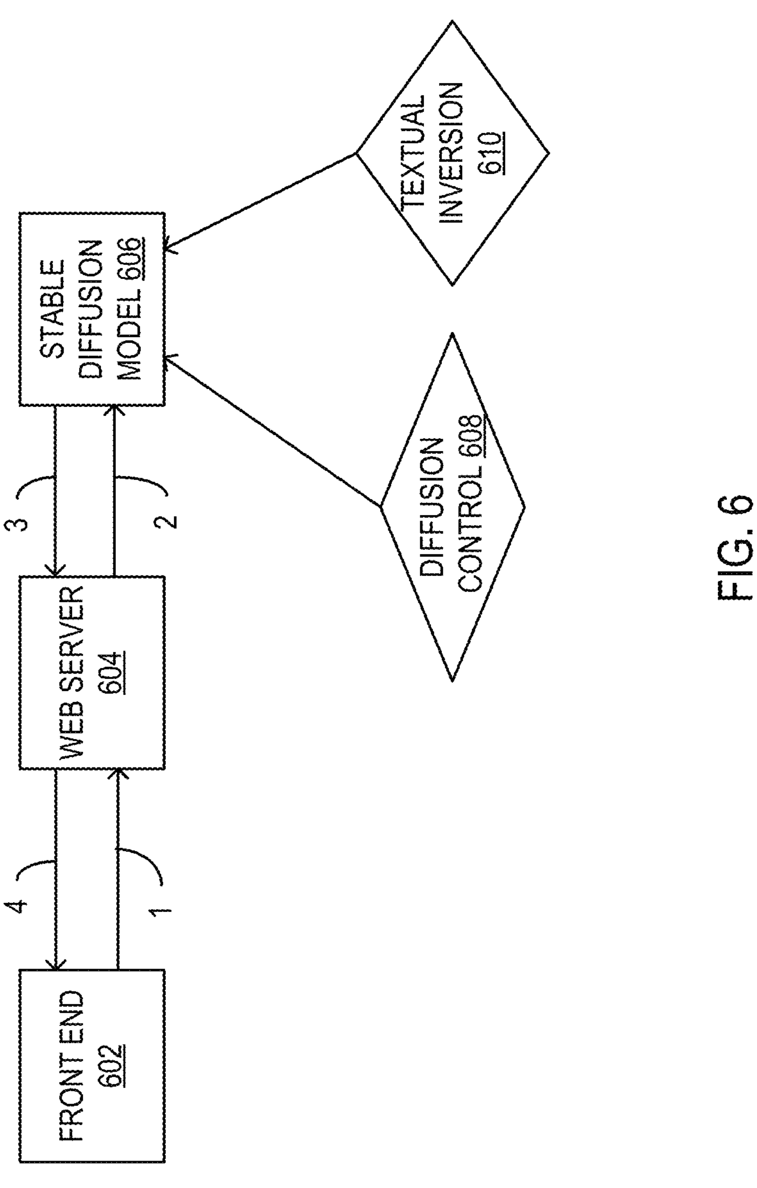
Figure 7:
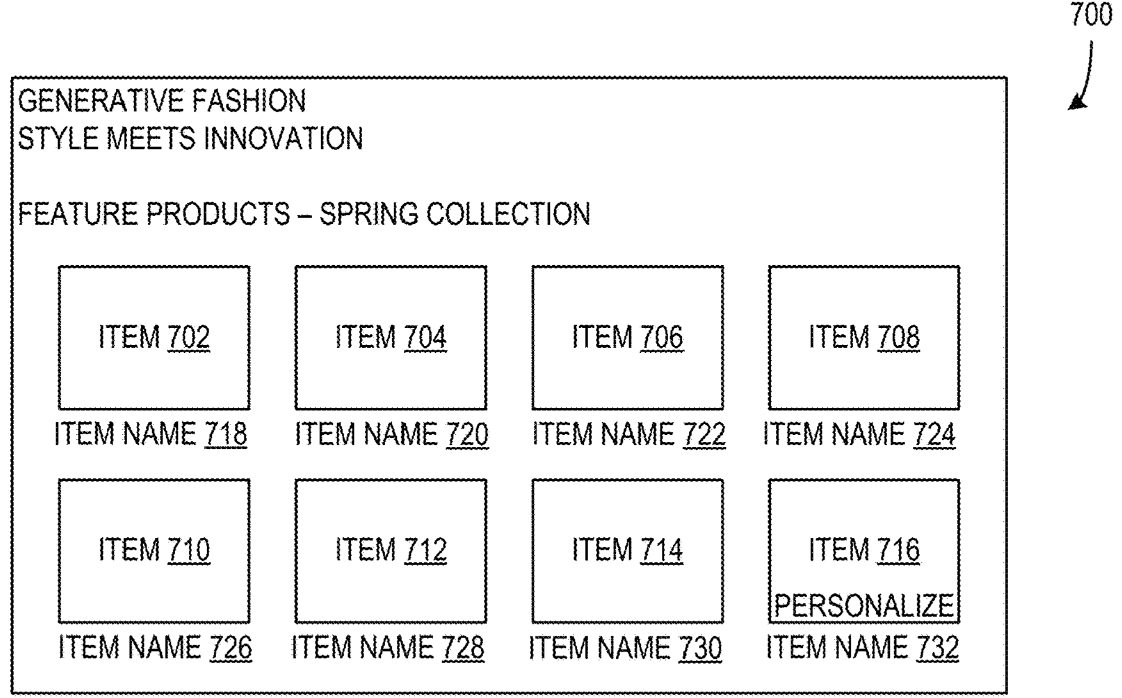
FIGS. 7, 8, 9, and 10 illustrate an example user interface (UI) workflow for personalizing an article according to a particular style using the AI model.
Figure 8:
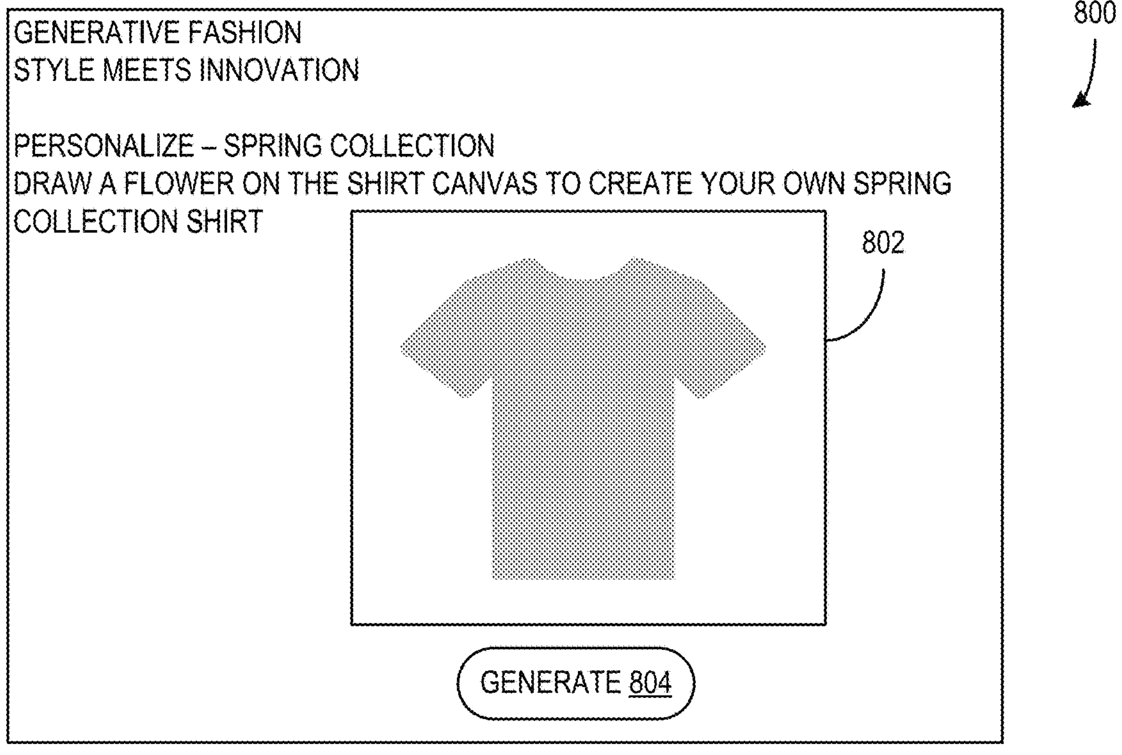
Figure 9:
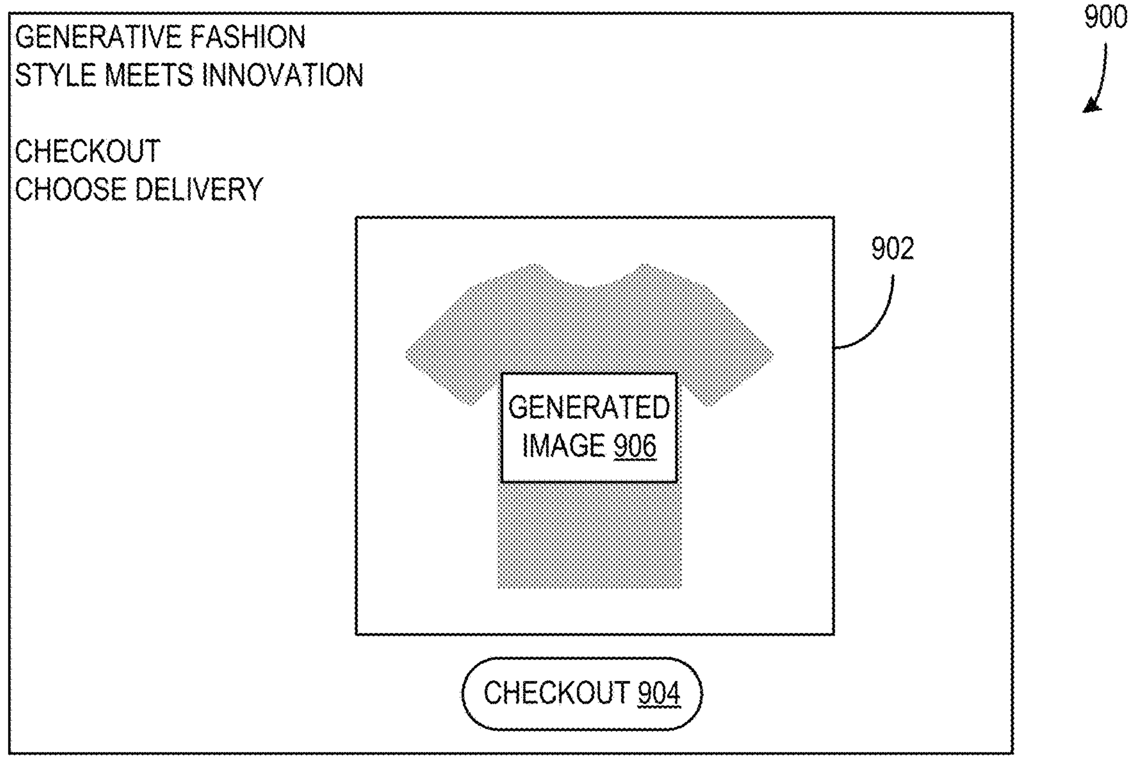
Figure 10:
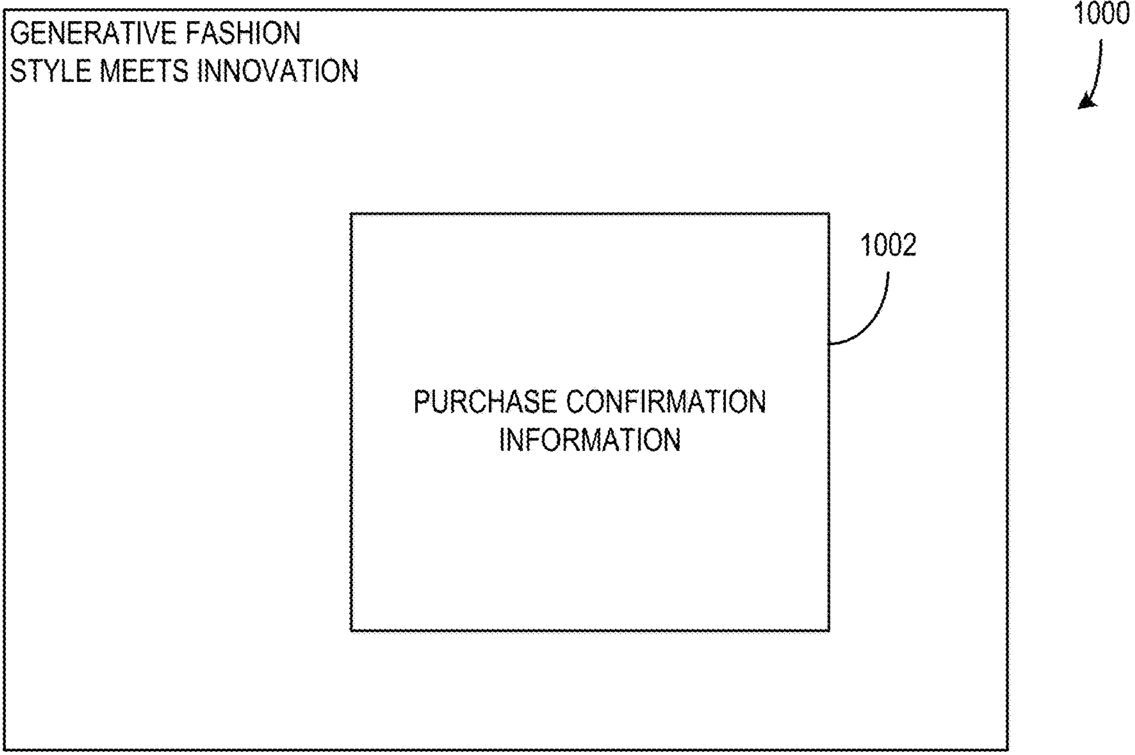

FIG. 6 is an example implementation 600 of the disclosure. In some examples, the implementation 600 is included in and/or part of a system such as systems 100 and/or 200 of FIGS. 1 and/or 2, above. A front end (e.g., UI) 602 receives an input (e.g., drawing) from a user. The input is sent to a web server 604 at operation 1. The web server 604 sends the input to a stable diffusion model 606 (e.g., an image generation model) at operation 2. The stable diffusion model 606 generates an image based on the input and transmits the generated image to the web server 604 at operation 3. The web server 604 transmits the generated image to the front end 602 at operation 4, for display or presentation to the user. In some examples, the model is further specialized using a textual inversion technique 610 such that the items produced fall in line with the style shown on the website. Additionally, or alternatively, diffusion control techniques 608 (e.g., ControlNet) are used to improve the capabilities of the stable diffusion model to translate drawing input from users into high quality images.

FIGS. 7, 8, 9, and 10 illustrate an example UI workflow 700, 800, 900, and 1000 for personalizing an article in a particular style using the AI model as described herein. In some examples, the illustrated portions of the workflow are displayed to a user via a UI such as the UI 102 of FIG. 1 and/or the UI 210 of FIG. 2. In other examples, other information, images, or other portions of the UI are displayed to a user without departing from the description.

UI workflow 700 includes a window displaying featured products of a spring collection (e.g., items 702, 704, 706, 708, 710, 712, 714, and 716), which may be any sorts of items but, in some examples, the items 702-716 are clothing items, accessory items, or other types of fashion items. Each item is displayed with an item name (e.g., names 718, 720, 722, 724, 726, 728, 730, and 732, respectively). Further, a user of the UI is prompted to personalize one or more displayed items. As illustrated, the user is prompted to personalize item 716 (e.g., the user selects or otherwise highlights the item 716 and the "personalize" option is displayed as a result of this interaction).

UI workflow 800 is displayed following the user selecting to personalize an item on UI workflow 700. The item is displayed in a portion 802 and the user is prompted to "draw a flower on the shirt canvas to create your own spring collection shirt". In some examples, the UI is configured to enable the user to draw on the displayed shirt in portion 802 or otherwise provide drawing input thereon. The generate button 804 is configured to be pressed or otherwise activated when the user has completed providing drawing input.

UI workflow 900 is displayed following the user activating the generate button 804 of UI workflow 800. The item is displayed in the UI portion 902 with a generated image 906 placed on the item. As illustrated, the generated image 906 is shown on the front of a shirt. The user is enabled to evaluate the generated image 906 and, if they approve of the generated image 906, the user is enabled to initiate a checkout process by activating the checkout button 904. In other examples, the user is enabled to return to a previous UI if they do not approve of the generated image 906.

UI workflow 1000 is displayed following the user activating the checkout button 904 of UI workflow 900. Purchase confirmation information is displayed in a UI portion 1002. In other examples, the checkout process includes prompting the user to provide payment details, enabling the user to enter payment information, or the like. In other examples, more, fewer, or other steps are included in the checkout process without departing from the description.

Example settings for ControlNet are shown below:

```
//COMMENT: zay-style-4400 references the textual inversion for the
specific style of the images on our website
app.post('/generate', async (req, res, next) => {
  var options = {
    'method': 'POST',
    'url': 'http://127.0.0.1:7860/sdapi/v1/img2img',
    'headers': {
      'Content-Type': 'application/json'
    },
  body: JSON.stringify({
    "init_images": [
      req.body.param
    ],
    "include_init_images":true,
    "prompt": "flower graphic design on shirt, assorted pink flowers on
shirt, product listing image, professional photography",
    "steps": 20,
    "sampler_name": "DPM2",
    "sampler_index": "DPM2",
    "seed": -1,
    "denoising_strength": 0.45,
    "cfg_scale": 13,
    "negative_prompt": "model, arms, legs, man, person"
  })
  };
  request(options, function (error, response) {
    if (error) throw new Error(error);
    console.log(response.body);
    console.log("request", req.body);
    res.send(response.body);
  });
})
app.post('/generateBag', async (req, res, next) => {
  var options = {
    'method': 'POST',
    'url': 'http://127.0.0.1:7860/sdapi/v1/img2img',
    'headers': {
      'Content-Type': 'application/json'
    },
  body: JSON.stringify({
    "init_images": [
      req.body.param
    ],
    "include_init_images":true,
    "prompt": "birkin bag, flower graphic design on bag, assorted
flowers, product listing image, professional photography",
    "steps": 20,
    "sampler_name": "DPM2",
    "sampler_index": "DPM2",
    "seed": -1,
    "denoising_strength": 0.45,
    "cfg_scale": 13,
    "negative_prompt": "model, arms, legs, man, person"
  })
  };
  request(options, function (error, response) {
    if (error) throw new Error(error);
    console.log(response.body);
    console.log("request", req.body);
    res.send(response.body);
  });
})
app.post('/controlnet', async (req, res, next) => {
```

-continued

```
  var options = {
    'method': 'POST',
    'url': 'http://127.0.0.1:7860/controlnet/img2img',
    'headers': {
      'Content-Type': 'application/json'
    },
  body: JSON.stringify({
      "init_images": [
        req.body.param
      ],
      "include_init_images":true,
      "prompt": "flower graphic design on shirt, neutral colors, assorted
flowers on shirt,product listing image, professional photography, art by
zay-style-4400",
      "steps": 20,
      "sampler_name": "DPM2",
      "sampler_index": "DPM2",
      "seed": -1,
      "subseed": -1,
      "subseed_strength": 0,
      "batch_size": 1,
      "n_iter": 1,
      "denoising_strength": 0.45,
      "cfg_scale": 12,
      "width": 512,
      "height": 512,
      "sampler_index": "DPM2",
      "controlnet_input_image": [
        req.body.newparam
      ],
      "controlnet_module": "fake_scribble",
      "controlnet_model": "control_sd15_scribble [fef5e48e]",
      "controlnet_guidance": 1.0,
      "negative_prompt": "model, arms, legs, man, person"
    })
    };
  request(options, function (error, response) {
      if (error) throw new Error(error);
      console.log(response.body);
      console.log("request", req.body);
      res.send(response.body);
    });
})
```

What is claimed is:

1. A physical article modification system comprising:

a processor;

a graphical user interface (GUI); and a memory comprising computer program code, the memory and the computer program code configured to cause the processor to:

display, on a display device of the GUI, an image that comprises an image of a physical article;

select an image style;

train an image generation model using the selected image style;

receive, from the GUI, an image request input that comprises a drawing input;

receive, from the GUI, information indicating one or more characteristics comprising one or more of: a color, a size relative to a size of the image of the physical article, a rotational orientation relative to an orientation of the image of the physical article, or a location with respect to the image of the physical article;

generate an image based on the received image request input using the trained image generation model, wherein the generated image is in the selected image style;

output the generated image to the GUI in response to the received image request input, including updating the image displayed on the display device with the generated image superimposed on the image of the physical article such that the generated image conforms with the one or more characteristics; and send instructions to an automated device to cause the automated device to print the generated image onto the physical article in conformance with the one or more characteristics.

2. The physical article modification system of claim 1, wherein the computer program code is configured to further cause the processor to:

receive feedback associated with the generated image; and train the image generation model using the received feedback.

3. The physical article modification system of claim 1, wherein the received image request input further includes at least one of a text input and a voice input.

4. The physical article modification system of claim 1, wherein the trained image generation model is a stable diffusion model, and the stable diffusion model is enhanced using a diffusion control model and a textual inversion model.

5. The physical article modification system of claim 1, wherein the memory and the computer program code being configured to cause the processor to receive the image request input includes the memory and the computer program code being configured to cause the processor to:

prompt a user of the GUI to input the drawing input on the image of the physical article; and receive, in response to the prompting and via the GUI, user input from an input device of the GUI, the user input defining a hand-drawn image, wherein the drawing input comprises the hand-drawn image.

6. A computer-implemented physical article modification method comprising:

displaying, on a display device of a graphical user interface (GUI), an image that comprises an image of a physical article;

receiving, from the GUI, an image request input that comprises a drawing input;

receiving, from the GUI, information indicating one or more characteristics comprising one or more of: a color, a size relative to a size of the image of the physical article, a rotational orientation relative to an orientation of the image of the physical article, or a location with respect to the image of the physical article;

generating an image based on the received image request input using a trained image generation model, wherein the generated image is in an image style for which the trained image generation model was trained;

outputting the generated image to the GUI in response to the received image request input, including updating the image displayed on the display device with the generated image superimposed on the image of the physical article such that the generated image conforms with the one or more characteristics; and send instructions to an automated device to cause the automated device to print the generated image onto the physical article in conformance with the one or more characteristics.

7. The computer-implemented physical article modification method of claim 6, further comprising:

selecting the image style; and training the image generation model using the selected image style.

8. The computer-implemented physical article modification method of claim 7, further comprising:

receiving feedback associated with the generated image; and training the image generation model using the received feedback.

9. The computer-implemented physical article modification method of claim 6, wherein the received image request input further includes at least one of a text input and a voice input.

10. The computer-implemented physical article modification method of claim 6, wherein the trained image generation model is a stable diffusion model, and the stable diffusion model is enhanced using a diffusion control model and a textual inversion model.

11. The computer-implemented physical article modification method of claim 6, wherein receiving the image request input includes:

prompting a user of the GUI to input the drawing input on the image of the physical article; and receiving, in response to the prompting and via the GUI, user input from an input device of the GUI, the user input defining a hand-drawn image, wherein the drawing input comprises the hand-drawn image.

12. A non-transitory computer storage medium having computer-executable instructions that, upon execution by a processor, cause the processor to perform a computer-implemented physical article modification method that comprises:

displaying, on a display device of a graphical user interface (GUI), an image that comprises an image of a physical article;

selecting an image style;

training an image generation model using the selected image style;

receiving, from the GUI, an image request input that comprises a drawing input;

receiving, from the GUI, information indicating one or more characteristics comprising one or more of: a color, a size relative to a size of the image of the physical article, a rotational orientation relative to an orientation of the image of the physical article, or a location with respect to the image of the physical article;

generating an image based on the received image request input using the trained image generation model, wherein the generated image is in the selected image style;

outputting the generated image to the GUI in response to the received image request input, including updating the image displayed on the display device with the generated image superimposed on the image of the physical article such that the generated image conforms with the one or more characteristics; and sending instructions to an automated device to cause the automated device to print the generated image onto the physical article in conformance with the one or more characteristics.

13. The non-transitory computer storage medium of claim 12, wherein the computer-executable instructions, upon execution by the processor, further cause the processor to at least:

receive feedback associated with the generated image; and train the image generation model using the received feedback.

14. The non-transitory computer storage medium of claim 12, wherein the received image request input includes at least one of a text input and a voice input.

15. The non-transitory computer storage medium of claim 14, wherein the trained image generation model is a stable diffusion model, and the stable diffusion model is enhanced using a diffusion control model and a textual inversion model.

16. The non-transitory computer storage medium of claim 12, wherein receiving the image request input includes:

prompting a user of the GUI to input the drawing input on the image of the physical article; and receiving, in response to the prompting and via the GUI, user input from an input device of the GUI, the user input defining a hand-drawn image.

17. The physical article modification system of claim 1, wherein the memory and the computer program code are further configured to cause the processor to:

obtain the drawing input from graphical input supplied by the GUI and generated from user interaction with the GUI.

18. The computer-implemented physical article modification method of claim 6, wherein the computer-implemented physical article modification method further comprises:

obtaining the drawing input from graphical input supplied by the GUI and generated from user interaction with the GUI.

19. The non-transitory computer storage medium of claim 12, wherein the computer-implemented physical article modification method further comprises:

obtaining the drawing input from graphical input supplied by the GUI and generated from user interaction with the GUI.

* * * * *